Patented Feb. 10, 1942

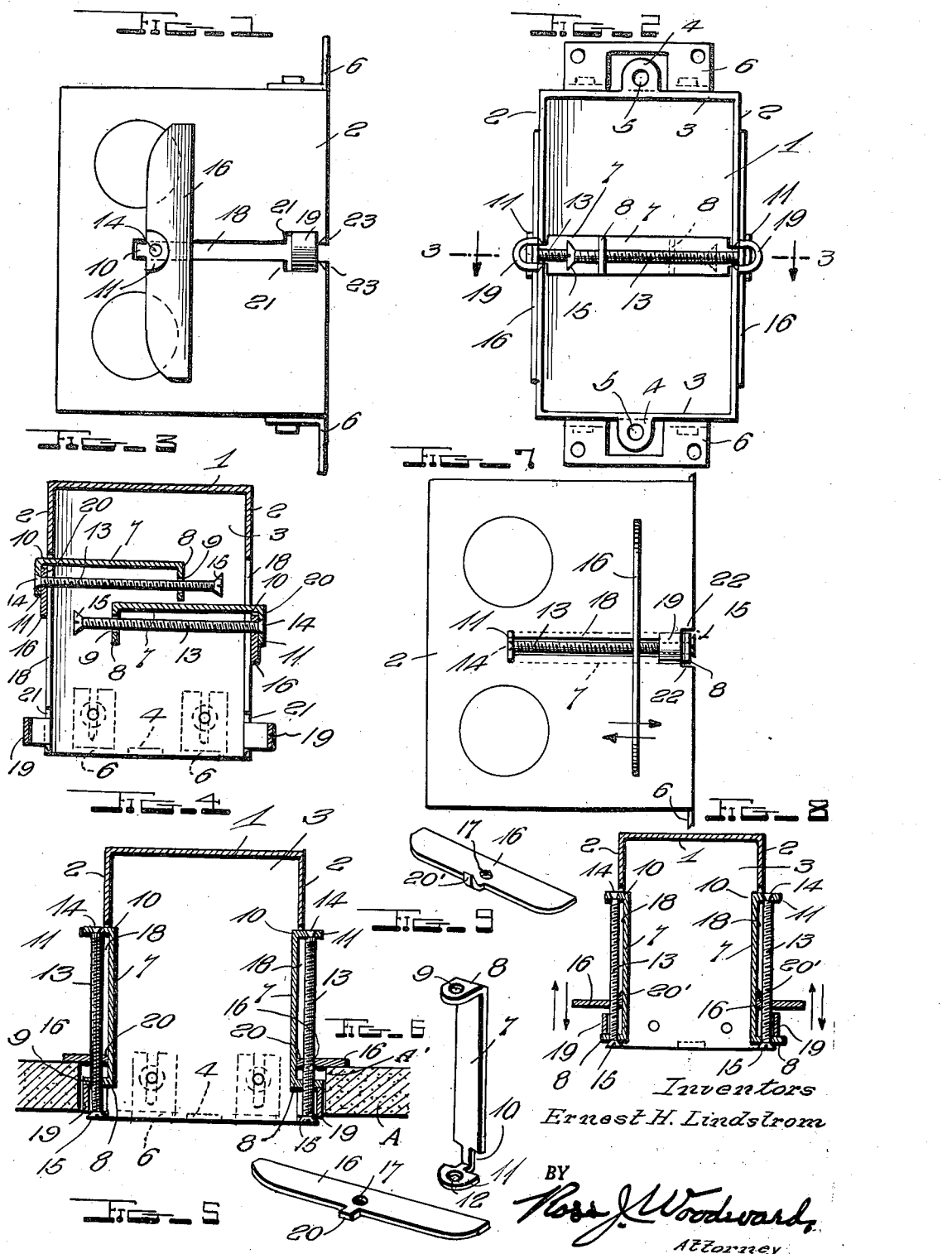

2,272,846

UNITED STATES PATENT OFFICE 2,272,846

OUTLET BOX

Ernest H. Lindstrom, Los Angeles, Calif.

Application August 26, 1940, Serial No. 354,296

6 Claims. (Cl. 220—3.6)

This invention relates to an outlet box of the type used in house wiring for plugging in floor lamps, waffle irons, and other electrical equipment, and it is one object of the invention to provide such a box with improved means for securing same in an opening formed in a floor or wall.

Another object of the invention is to provide the box with securing means including plates adapted to engage back of a floor or wall board at sides of an opening through which the box passes and exert pressure thereon to firmly hold the box in place.

Another object of the invention is to provide improved securing means consisting of plates carried by adjusting screws rotatably mounted in bearing members or brackets which are so associated with the box that the plates may be disposed flat against walls of the box while fitting the box in place through the receiving opening therefor and then moved to extended position and shifted into tight gripping engagement with a floor or wall board to hold the box in place.

Another object of the invention is to so form and mount the bearing brackets that they may be easily tilted inwardly to dispose the gripping plates against walls of the box during insertion of the box through an opening but prevent them from tilting out of set position after the brackets have been adjusted to project the plates from the walls of the box and the screws turned to move the plates toward gripping position.

Another object of the invention is to provide improved securing means which may be easily applied to an outlet box of conventional construction after a slight modification has been made in walls of the box.

The invention is illustrated in the accompanying drawing wherein:

Fig. 1 is a side elevation of the improved outlet box, the securing means being illustrated in inoperative position.

Fig. 2 is a view looking at the open end of the outlet box.

Fig. 3 is a sectional view taken transversely through the outlet box on the line 3—3 of Fig. 2.

Fig. 4 is a transverse sectional view showing the box fitted through an opening in a wall board and held in place by the improved securing means.

Fig. 5 is a perspective view of one of the securing plates.

Fig. 6 is a perspective view of the bearing bracket.

Fig. 7 is a view similar to Fig. 1, showing a modification.

Fig. 8 is a sectional view taken transversely through the modified form of box.

Fig. 9 is a perspective view of one of the blades shown in Figs. 7 and 8.

The outlet box has the usual bottom 1, side walls 2, and end walls 3, it being understood that these walls may be integral or secured to each other in any desired manner. The usual ears 4, formed with threaded openings 5, project outwardly from the end walls of the box in order that a cover plate may be secured to the box by screws engaged through the openings 5. There have also been provided the customary brackets 6 which engage in recesses formed in a floor or wall board A at ends of the opening A' through which the box passes. These brackets customarily receive screws by means of which the box is secured through the opening. A box equipped with the improved securing means to be now described does not need securing screws through the brackets 6 and these brackets will merely serve as outer members for limiting movement of the box through the opening A' and assisting in securing the box in place.

The improved securing means consists of clamps mounted at opposite sides of the box. The clamps are of duplicate construction and each includes a bracket 7 formed of stiff metal and having one end bent to form an arm or ear 8 having an opening 9 formed therein. The other end portion of the bracket is of reduced width to provide a shank or neck 10 which is bent outwardly intermediate its length and carries an ear 11 formed with an opening 12 which is alined with the opening 9 of ear 8. A screw or threaded stem 13 extends longitudinally of the bracket. This stem rotatably passes through the opening 9 and has its lower end journaled in the opening 12, as shown at 14, and the upper end of the stem is formed with a head 15 having a groove or eye formed therein so that the head may be engaged by a screw driver and the stem turned to shift a clamping plate or jaw 16 along the stem. This jaw is formed of stiff metal and midway its length is formed with a threaded opening 17 through which the stem engages, and it will be readily understood that when the stem is turned the jaw will be shifted along the stem from a position close to the ear 11 to a position for clamping engagement with the inner or under face or a wall board or floor through which the box passes. This is clearly shown in Fig. 4. The shanks 10 of the two brackets pass through slots 18 formed in the side walls 2 of the box, and adjacent outer ends of the slots, the side walls are provided with outstanding bearings 19 through which the outer end portions of the stems pass when the clamps are in operative position. When the clamps are in operative position, lugs 20, which project from the inner side edges of the jaws 16, engage in the slots to guide movement of the jaws. These lugs may be flush with the jaws, as shown in Fig. 5, or may be curved as shown at 20' in Figs. 8 and 9. It should be noted that when the clamps are in operative position, the ears 8 project outwardly and either pass through notches 21 formed at opposite sides of the slot 18 under the bearings 19, as shown in Figs. 1 and 3, or through recesses 22 formed in the side walls above the bearings, as shown in Figs. 7 and 8. When the ears are engaged through the recesses or notches 21, the heads of the stems are engaged in small recesses 23 and rest on the upper or outer ends of the bearings, as shown in Fig. 4, and when the ears are engaged in the recesses 22, the heads of the stems rest on the ears, as shown in Figs. 7 and 8.

When this improved outlet box is installed, the clamping plates are disposed at lower ends of the stems and the brackets may then be tilted inwardly to dispose them transversely of the box with the plates flat against outer faces of the side walls, as shown in Figs. 2 and 3. The box may then be slid inwardly through the opening A' until the brackets 6 abut the outer face of the floor or wall board A at opposite ends of the opening. The clamps are then swung upwardly to operative position with the ears or arms 8 of the brackets passing through the recesses 21 under the bearings 19, as shown in Fig. 4, or over the bearings, as shown in Fig. 8. When the clamps are in operative position, the stems are turned by means of a screw driver and the clamping plates will be shifted along the stems and the side walls of the box until the plates engage the inner face of the floor or wall board. The floor or wall board will then be firmly gripped by the clamping plates and by the brackets, and the box will be held in place. When the plates are shifted away from the ears 11, they constitute braces which extend across the slots 18 in spaced relation to lower ends thereof and prevent the brackets and stems from tilting inwardly and the clamps will be retained in position against the side walls longitudinally of the slots. Therefore, there is no danger of the clamps tilting inwardly out of position for use while the stems are being turned and the plates or jaws shifted into gripping engagement with the floor or wall board. When it is desired to remove the box for making repairs or replacements, it is merely necessary to turn the screws in reverse direction and the clamps will be shifted toward inner ends of the stems until the stems and brackets may be tilted to the folded or inoperative position shown in Fig. 3. The plates or jaws will then be again disposed flat against outer faces of the side walls and the box may be withdrawn from the opening in which it rests.

While the invention has been illustrated and described as an outlet box for electric wiring, it is to be understood that it may be incorporated in any box-like structure intended to be mounted through an opening in a support such as a wall or floor.

Having thus described the invention, what is claimed is:

1. A box having walls formed with slots, outstanding bearings being provided across outer end portions of the slots, and clamps carried by the slotted walls, each clamp comprising a bracket of a length substantially corresponding to the length of a slot and having one end formed with an ear for extending outwardly in engagement with an end of a bearing and its other end formed with a shank passing through the slot and terminating in an ear of greater width than the slot, alined openings being formed in the ears, a threaded stem extending longitudinally of the bracket and rotatably mounted through the openings in the ears, a turning head being provided at the upper end of the stem, and a jaw consisting of a plate formed intermediate its length with a threaded opening receiving the stem and a lug extending from the inner side edge of the plate for engaging in the slot and guiding movement of the plate along the stem when the stem is turned to shift the plate thereon, said bracket being tiltable with the stem from reclining position transversely of the box to dispose the plate flat against the outer face of the wall in inoperative position to operative position longitudinally of the slot permitting rotation of the stem to shift the plate along the stem to clamping position, said plate when shifted along the stem toward clamping position bridging the slot and having its inner side edge engaging the wall to hold the bracket in place.

2. A box having a wall formed with a slot, a bearing across the outer portion of the slot, and a clamp comprising a bracket extending longitudinally of the slot when the clamp is in operative position, an ear at the outer end of the bracket for extending through the slot against one end of the bearing, a shank at the inner end of the bracket passing through the slot and carrying an ear bearing against the outer face of the wall at opposite sides of the slot, a threaded stem journaled through said ears and having a turning head at its outer end, and a jaw consisting of a plate formed with a threaded opening receiving the stem, said shank passing loosely through the slot and permitting tilting of the bracket from a position longitudinally of the slot with the plate projecting laterally from the wall to reclining position within the box transversely thereof to dispose the plate flat against the outer face of the wall.

3. A box having a wall formed with a slot and provided with a bearing across the outer portion of the slot, there also being provided recesses at opposite sides of the slot at one end of the bearing, and a clamp comprising a bracket of greater width than the slot disposed longitudinally of the slot against the inner face of the wall when the clamp is in operative position, said bracket having one end bent to form an ear for passing outwardly through the recesses against an end of the bearing, the other end portion of the shank being of reduced width to form a shank passing through the slot and terminating in an ear for engaging the outer face of the wall at opposite sides of the slot, a threaded stem extending longitudinally of the bracket and journaled through the ears, and a jaw consisting of a plate formed with a threaded opening receiving the stem to mount the plate for adjustment longitudinally of the stem when the stem is turned, said plate having a lug opposite its threaded opening for engaging in the slot and guiding movement of the plate.

4. A box having a wall formed with a slot and provided with a bearing across the outer end portion of the slot, a bracket within the box formed with ears at its ends and having a position passing through the slot to mount the bracket for tilting movement from a position longitudinally of the slot with the ears projecting outwardly from the wall to reclining position transversely of the box, a threaded stem journaled through said ears and extending longitudinally of the bracket, and a clamping member disposed externally of the wall and formed with a threaded opening receiving the stem and mounting the clamping member for adjustment along the stem when the stem is turned.

5. A box having a wall formed with a slot and provided with a bearing across the outer end portion of the slot, and a clamp comprising a bracket within the box mounted for tilting movement from operative position longitudinally of the slot to reclining position within the box transversely thereof, said bracket having ears projecting outwardly from the wall when the clamp is in operative position, a threaded stem rotatably mounted through the ears and extending longitudinally of the slot externally of the box and through the bearing when the clamp is in operative position, and a jaw in threaded engagement with said stem for adjustment longitudinally thereof when the stem is turned, said jaw projecting laterally from the wall when the bracket is disposed longitudinally of the slot and being disposed against the outer face of the wall when the bracket is in reclining position.

6. A box having a wall formed with a slot and having a bearing across the outer end portion of the slot, and a clamp comprising a bracket carried by the wall and tiltable from a position longitudinally of the slot to a reclining position within the box transversely thereof, ears carried by said bracket and projecting from the wall when the bracket is disposed longitudinally of the slot, a threaded stem rotatably carried by said ears and passing through the bearing when the bracket is in position for extending longitudinally of the slot, and a clamping member in threaded engagement with the stem and located externally of the box.

ERNEST H. LINDSTROM.